United States Patent [19]

McClanahan

[11] Patent Number: 5,290,190
[45] Date of Patent: Mar. 1, 1994

[54] TALKING BOOK

[76] Inventor: Susan D. McClanahan, 1088 Park Ave. South, New York, N.Y. 10016

[21] Appl. No.: 953,231

[22] Filed: Sep. 30, 1992

[51] Int. Cl.$^5$ ............................................. G09B 5/00
[52] U.S. Cl. ................................................. 434/317
[58] Field of Search .................... 434/308, 317, 311; 40/594, 595

[56] References Cited

U.S. PATENT DOCUMENTS

| | | | |
|---|---|---|---|
| 3,592,098 | 7/1971 | Zadig | 84/483 |
| 4,021,932 | 5/1977 | Lipps | 434/317 |
| 4,363,081 | 12/1982 | Wilbur | 434/317 X |
| 4,497,126 | 2/1985 | Dejean | 40/124.1 |
| 4,636,881 | 1/1987 | Bretka et al. | 434/317 X |
| 4,703,573 | 11/1987 | Montgomery et al. | 40/455 |
| 4,752,230 | 6/1988 | Shimizu | 434/317 |
| 4,809,246 | 2/1989 | Jeng | 434/317 |
| 4,990,092 | 2/1991 | Cummings | 434/317 |
| 5,167,508 | 12/1992 | McTaggart | 434/317 |

FOREIGN PATENT DOCUMENTS

| | | | |
|---|---|---|---|
| 3140735 | 4/1983 | Fed. Rep. of Germany | 235/494 |
| 213037 | 4/1990 | Japan | 434/169 |
| 9106090 | 5/1991 | PCT Int'l Appl. | |

Primary Examiner—Gene Mancene
Assistant Examiner—Jeffrey A. Smith
Attorney, Agent, or Firm—Rogers & Killeen

[57] ABSTRACT

A talking book with a plurality of pages each having a switch operable from opposite sides of the page, with all of the audio components located other than on the page, e.g., in the binding. A switch may also be provided in the binding for a selective audio presentation without opening the book, and illumination means may be provided within the pages in addition to the audio.

10 Claims, 1 Drawing Sheet

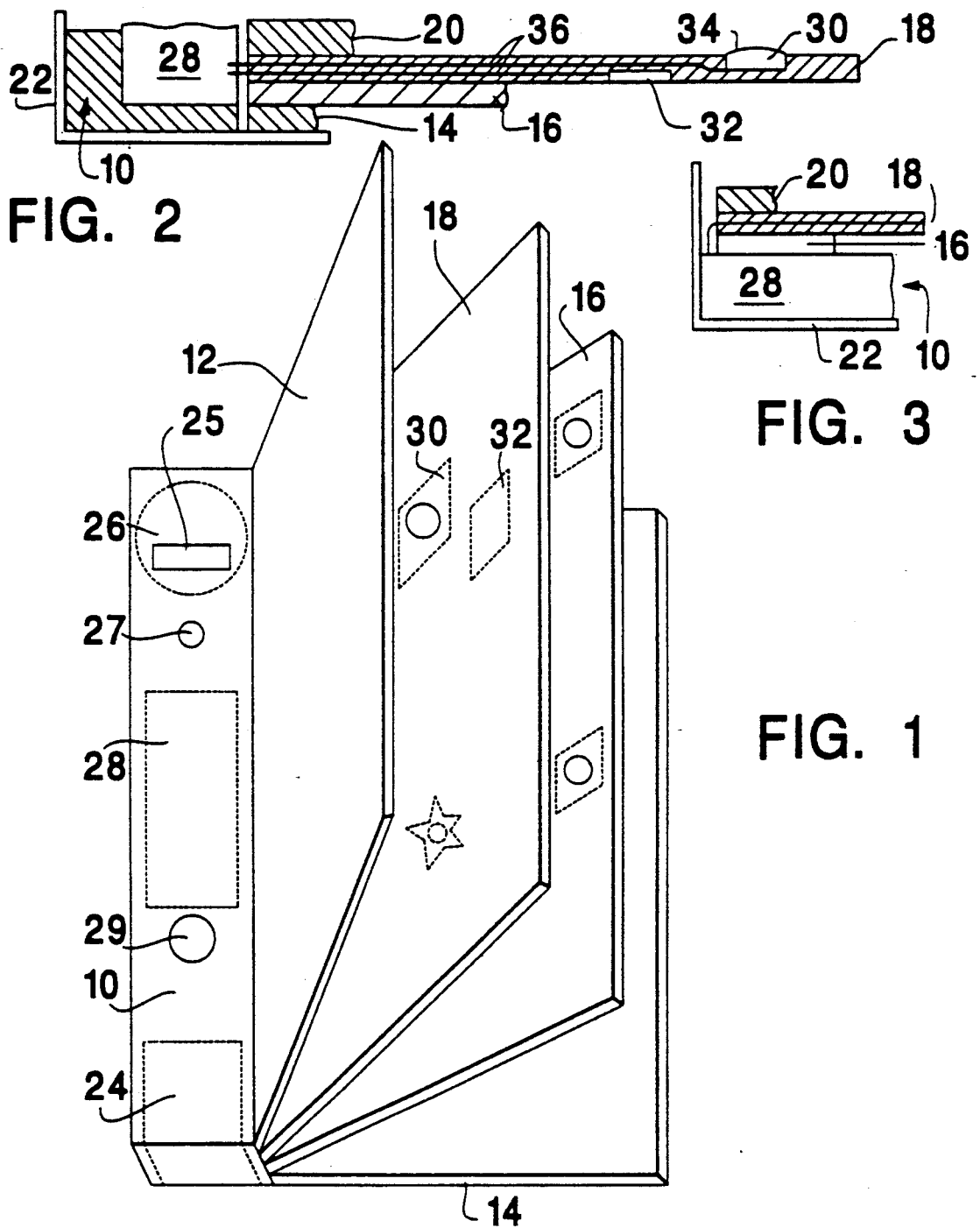

TALKING BOOK

BACKGROUND OF THE INVENTION

Talking books are well known and generally include a plurality of pages of printed material, (i.e., pictures and/or text) and a plurality of voice chips selectively activated through a speaker by switches operable as the reader turns the pages to access the text.

Known talking books generally require separate audio units to be used in connection with the book, although self-contained talking books are also known. One such system is disclosed in U.S Pat. No. 4,752,230 which employs a rear cover mounted, push button panel such as generally found on a Touch-tone ® telephone, in which the panel is accessible from all pages in the book through cut-outs in the pages. Another book such as that disclosed in U.S. Pat. No. 4,990,092 includes a back panel wherein all of the electronic components are mounted along with a plurality of switches which may be operated, the switches being operated through the pages by pressing predetermined marks on the various pages. Other books of this general type locate all of the audio components and switches in the margin on the inside of the back cover where they are accessible to the right of the pages in the book.

Difficulties arise in the operation of the switches through one or more pages of the book and/or the loss of surface area of the page which can be devoted to illustrations and/or text because of the cut-outs. In addition, the known talking books require that the reader risk a loss of continuity in the story by diverting attention from the material on the page to a separate audio unit.

It is accordingly an object of the present invention to obviate many of the deficiencies of known talking books and to provide a novel talking book in which the switches that control the supplemental audiovisual components are carried by the page in locations consistent with the story printed thereon so that the reader need not risk the loss of continuity of the story in invoking the audiovisual effects.

It is another object of the present invention to provide a novel talking book in which the switches that control the supplemental audiovisual components are contained entirely internally of the pages of the book.

It is yet another object of the present invention to provide a novel talking book in which the supplemental audiovisual components carried externally of the pages are controlled by switches carried by the pages of the book.

It is still another object of the present invention to provide a novel talking book in which supplemental visual components carried by the pages of the book are controlled by switches carried by the pages of the book.

It is still yet another object of the present invention to provide a novel talking book in which supplemental audiovisual components and the printed materials are fully integrated.

A further object of the present invention is to provide a novel talking book in which the characters illustrated on the various pages may become the story tellers.

In addition, known talking books do not use illumination in connection with the audio components to supplement the story. It is accordingly a further object of the present invention to provide a novel talking book which selectively supplements the text by drawing attention to, or back-lighting, the illustrations and/or text of the story, thereby attracting and retaining the attention of young readers.

These and many other objects and advantages of the present invention will be apparent to one skilled in the art from a perusal of the claims when read in conjunction with the drawings and following detailed description.

BRIEF DESCRIPTION OF THE DRAWINGS

FIG. 1 is a pictorial illustration of one embodiment of the talking book of the present invention;

FIG. 2 is a bottom view of the talking book of FIG. 1 in elevation and in partial section illustrating the construction of a page thereof; and FIG. 3 is a bottom view of a second embodiment of the talking book of FIG. 1 in elevation and in partial section illustrating the integration of the electronic components into the back cover of the book.

DETAILED DESCRIPTION OF THE PREFERRED EMBODIMENTS

With reference to the figures, a preferred embodiment of the talking book of the present invention includes a binding 10, a front cover 12, a back cover 14, and a plurality of pages 16 and 18 (a third page 20 is illustrated in FIG. 2). As is well known in the art, and as illustrated in FIG. 2, the entire book may be provided with a cosmetic cover 22 and the pages 16–20 hinged to the binding 10 in any suitable conventional manner (not shown).

As used herein, the "binding" 10 serves as the containment for the electronic components. As illustrated in FIGS. 1 and 2, it is in the spine of the book. However, as shown in FIG. 3, the binding 10 may also be integrated with the back cover of the book.

With reference to the embodiment of FIGS. 1 and 2, the electronic components of the audio system are conveniently located in the binding 10 in the locations shown in dashed lines. For example, the binding 10 may be provided with a suitable conventional power supply such as batteries in a battery compartment 24, may contain a suitable conventional speaker 26 which may be visible through or hidden by the decorative cover 22 as desired, and may contain the audio generating means 28.

The audio generating means 28 may be in any suitable conventional circuit, and is referred to herein as "voice chips", although it is to be understood that the term encompasses one or more circuits by which certain predetermined sounds may be synthesized under the control of conventional logic circuitry, all under the control of suitable conventional switches associated with the individual pages. By the use of read-only-memory devices and an appropriate logic circuit, the sounds for various switches may be synthesized from a relatively small number of tone producing components.

The power supply 24 may be connected in any suitable conventional manner (not shown) to both the speaker 26 and the voice chips 28, and a switch 27 may be provided on the binding 10 to test the operation of the circuit and to provide an invitation to the reader to turn the pages.

The battery compartment 24 may be replaced by any suitable conventional solar panel 25 to provide the operating power for the electronic components of the talking book.

As illustrated in the figures, each of the pages may be provided with one or more switches to control the operation of one or more of the voice chips 28. The switches may be located on the page in a position consistent with the illustrations and/or text thereon, and may be any suitable conventional switch such as one responsive to the detection of the presence, by pressure or otherwise, of the finger of a reader. The binding 10 may also include a switch 29 that may be used to operate one or more of the voice chips 28 with the cover 12 closed.

The pressure responsive switches 30 and 32 illustrated in the figures may be hidden from the reader with the pressure responsive surface activation areas thereof marked by the overlying text. Alternatively, the surface activation areas of the switches may be made visible to the reader through a cut-out in the overlying text.

As shown in FIG. 2, it is desirable for each of the pages to contain one or more switches selectively activated from the opposite sides of the page, e.g., switch 30 is upwardly, facing for activation from the front of the page and switch 32 is downwardly facing from the back of the page. Each of the pages may have a single-ply core that is thick enough to contain the switches 30 and 32, as discussed on pages 16 and 18 hereof and as illustrated in FIG. 2.

Each of the switches may be connected in any suitable conventional manner to the voice chips 28 by small diameter insulated wiring or by flexible flat wiring such as screened on paper or plastic. Desirably, the wiring 36 is contained entirely within the thickness of the page, but may be screened upon or otherwise embossed upon or carried by the surface of the page.

As shown in FIG. 1, each of the pages may contain one or more light emitting diode or LED separately connected to the switch within the page, and may be simultaneously operable with one of the voice chips under the control of one of the pressure switches. The LEDs are also contained within the page and may either be directly visible to the reader or used in cut-outs within the page as back-lighting to illuminate a portion of the illustrations or text shown on the page.

While preferred embodiments of the present invention have been described, it is to be understood that the embodiments described are illustrative only, and that the scope of the invention is to be defined solely by the appended claims when accorded a full range of equivalence, many variations and modifications naturally occurring to those skilled in the art from a perusal hereof.

What is claimed is:

1. A talking book comprising:
a book with a plurality of pages of printed material, front and back covers and a binding for said pages and said covers, each of said pages comprising a single-ply core overlain with the printed material; speaker means located in said binding;
a plurality of electronic voice chips located in said binding, each of said chips being operatively connected to said speaker means within said binding;
a source of electrical power located in the binding of the book for supplying electrical power to said chips and to said speaker means internally of said binding; and
two or more pressure sensitive switches carried by each of said pages in a location consistent with the material printed on such page, each of said pressure sensitive switches being contained within the thickness of said single-ply core and each said single-ply core being sufficiently thick to prevent inadvertent activation of one of said pressure sensitive switches on an underlying page by the actuation of a switch on an overlying page, one of said two or more switches being operated from the front of said page and another being operated from the back of said page.

2. The talking book of claim 1 wherein the activating surface of each of said pressure sensitive switches is covered by the page in which said switch is contained.

3. The talking book of claim 1 wherein the activating surface of said pressure switches protrudes through the page in which said switch is contained.

4. The talking book of claim 1 further comprising insulated wiring covered by the page in which it is contained for connecting each of said chips to one of said pressure sensitive switches.

5. The talking book of claim 1 further comprising flexible flat wiring covered by the page in which it is contained for connecting each of said chips to one of said pressure sensitive switches.

6. The talking book of claim 1 wherein said power source includes a battery.

7. The talking book of claim 1 wherein said power source includes a solar panel.

8. The talking book of claim 1 including a pressure sensitive switch contained within said binding and operable with said cover closed for operating one of said voice chips.

9. A talking book comprising:
a book with a plurality of pages of printed material, front and back covers and a binding for said pages and said covers, each of said pages comprising a single-ply core;
a plurality of electronic voice chips and speaker means located in said binding;
a power source located in said binding for supplying electrical power to said chips and to said speaker means internally of said binding; and
two or more pressure sensitive switches carried by each said single-ply cores internally thereof with at least one of said switches being manually operable from one side of one of said pages and another of said switches being operable from the other side of said one page.

10. The talking book of claim 9 wherein said power supply includes a solar panel.

* * * * *